United States Patent [19]

d'Aniello

[11] Patent Number: 4,716,853

[45] Date of Patent: Jan. 5, 1988

[54] DISPOSABLE LITTER FOR CATS OR OTHER DOMESTIC ANIMALS

[76] Inventor: René S. d'Aniello, 1049, Petit Bernier, St-Jean (Quebec), Canada, J3B 6Y8

[21] Appl. No.: 842,897

[22] Filed: Mar. 24, 1986

[30] Foreign Application Priority Data

Apr. 19, 1985 [CA] Canada ................................. 479602

[51] Int. Cl.$^4$ ............................................. A01K 23/00
[52] U.S. Cl. .................................................... 119/1
[58] Field of Search .............................................. 119/1

[56] References Cited

U.S. PATENT DOCUMENTS

| | | | |
|---|---|---|---|
| 3,377,990 | 4/1968 | Mitchell | 119/1 |
| 3,826,229 | 7/1974 | Classe et al. | 119/1 |
| 3,831,557 | 8/1974 | Elesh | 119/1 |
| 4,096,827 | 6/1978 | Cotter | 119/1 |
| 4,325,325 | 4/1982 | Larter | 119/1 |
| 4,541,360 | 9/1985 | Higgins et al. | 119/1 |
| 4,553,671 | 11/1985 | Cheesman | 119/1 |
| 4,627,382 | 12/1986 | Muzzey | 119/1 |

*Primary Examiner*—Carl D. Friedman
*Assistant Examiner*—Caroline D. Dennison
*Attorney, Agent, or Firm*—Robic, Robic & Associates

[57] ABSTRACT

A disposable litter for cats or the like domestic animals, comprising a flat-bottom shallow container having an open top, made of rigid or semirigid material of the waterproof type or made waterproof. The litter also comprises a layer of absorbent material disposed at the bottom of the container and a membrane sealed directly to the container to hold the thick layer of absorbent material as long as desired in position at the bottom of the container. Once removed, the membrane gives access to the layer of absorbent material and thus allows transforming the latter and the container into which the absorbent material rests into a litter for cats or the like domestic animals. Advantageously, the container and the membrane are made of a low-cost material such as cardboard or a moulded plastic material in such a way as to form together a package of the disposable type that may be discarded with the thick layer of absorbent material once the latter is soiled. A moulded cover, having a handle and formed with feeding troughs, may also be provided.

6 Claims, 3 Drawing Figures

DISPOSABLE LITTER FOR CATS OR OTHER DOMESTIC ANIMALS

The present invention relates to a litter for cats or the like small domestic animals, such as guinea pigs, hamsters, rabbits, small dogs or any other small animal of the same type.

In the present specification as well as in the appended claims, what is to be understood by the term <litter> is the box or the container which is usually used by owners of small domestic animals to allow them to satisfy their natural needs.

As everyone knows, it is necessary, for the sake of elementary sanitation, to regularly change and clean litters used for cats or other domestic animals, in which litters are, in the very large majority of cases, constituted by a simple rigid container into which the owner of the animal pours a layer of sand, of sawdust, of wood chips or granules of absorbing materials usually sold in bags of ten pounds or more in most shopping centers with or without perfume or other deodorizing agents. The work of cleaning the litter implies not only throwing away the soiled absorbed material but also scouring and cleaning the container before depositing a new clean layer of absorbent material. This is not a very interesting nor hygienic work for the person having to do it.

An object of the present invention is to provide a new type of litter for cats or other domestic animals which makes it possible to avoid the unpleasant cleaning work mentioned above which must be done regularly in the case of litters of the conventional type.

More specifically, the object of the present invention is a new type of litter for cats or other animals which, by its construction, forms an assembly that the owner of the cat or domestic animal may throw away in the refuse container and immediately replace it by a new litter of the same type without having to do any cleaning work.

The litter for cats or other domestic animals, according to the invention, is characterized in that it comprises:

an open-top flat-bottom shallow container made of a rigid or a semirigid material of the waterproof type or impermeabilized type;

a layer of absorbant material disposed at the bottom of said container, and a membrane sealed to the container to hold the layer of absorbant material in position at the bottom of the said container as long as desired, the membrane once removed giving access to the said layer of absorbent material and transforming the said layer of absorbent material and the container into which it is disposed, into a litter for cats or other domestic animals.

This membrane may be in the form of a rigid or semi-rigid cover, sealed at the top of the container, or in the form of a simple oilpaper sheet or a plastic sheet glued or hot sealed directly onto the bottom or the walls of the container.

Advantageously, the container and, as the case may be, its cover may be made of a low-cost material such as rigid or semirigid plastic material or still cardboard of medium thickness which is waterproofed over at least one face, so as to form together a disposable package that may be thrown away with the thick layer of absorbent material once the latter is soiled.

The absorbent material may be of any type. It may, for instance, be sawdust, wood chips, paper pellets, sand, cork granules or any other similar material such as those presently found on the market for the same purpose.

According to a preferred embodiment of the invention, the above-described litter may be provided with a handle to facilitate grasping it and transporting it. This handle may form integral part of the container, but it should preferably be associated with the cover to serve as a gripping means as well as to facilitate removal of the cover whenever desired.

The litter according to the invention may have, of course, any form or dimension determined by the needs or taste of owners of cats or the like small animals. The litter for cats according to the invention may thus be of different sizes and shapes according to the size of the domestic animal for which it is intended. The litter according to the invention may also be conceived in such a manner as to adapt itself to other boxes, kennels, or the bottom of cages, namely bird cages.

Advantageously, the shape and size of the litters according to the invention can be conceived in such a manner as to allow nesting of containers one into the other to facilitate their storage in a restricted space on distributors shelves. The litter according to the invention may also be presented in groups of two or more boxes, having respect to their dimension and needs.

Besides, the cover, if there is one, may be moulded in such a way as to provide one or more disposable feeding-troughs, usable by the buyers of the litter for feeding or watering their domestic animals.

The invention will be better understood from the non-limitative description that follows of a preferred embodiment thereof, having reference to the appended drawings wherein.

Figure 1:
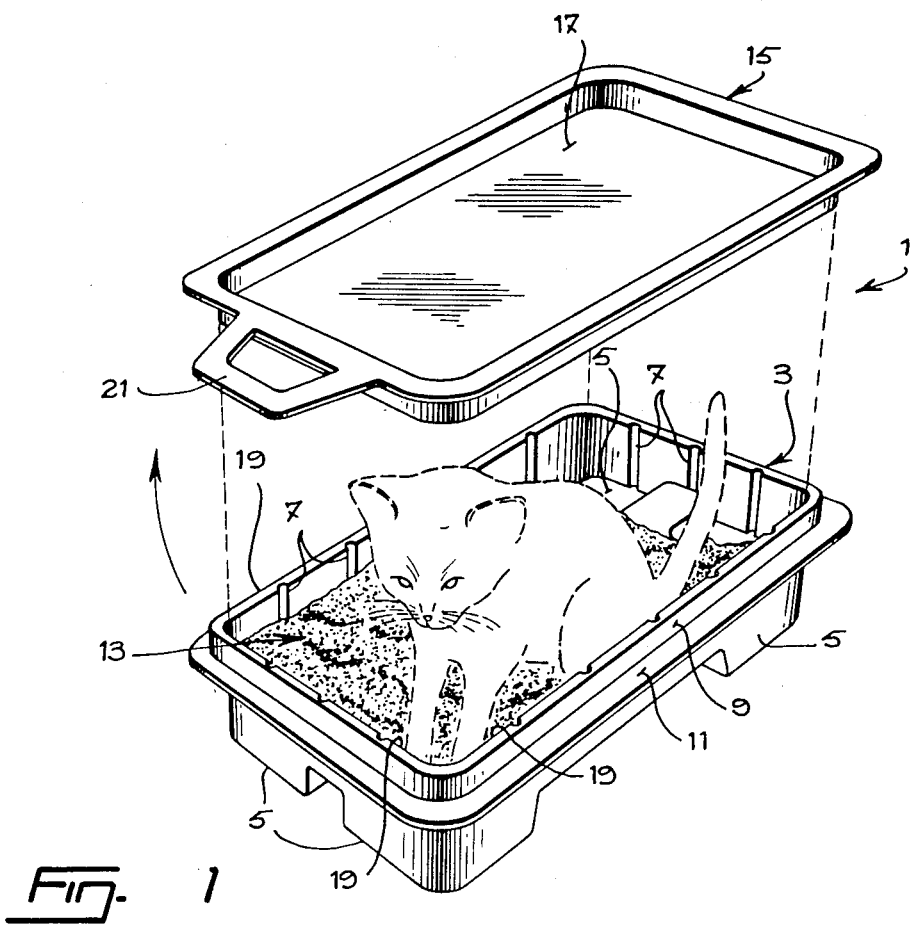
FIG. 1 is a perspective view of a litter for cats or other domestic animals according to the invention, of which the membrane is constituted by the cover shown in raised position.
Figure 2:
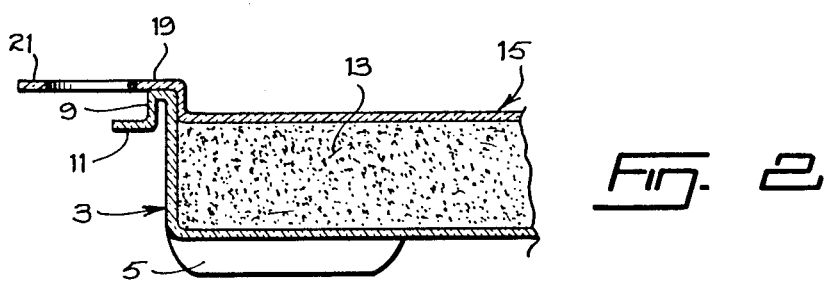
FIG. 2 is a cross-sectional view of one end of the litter in FIG. 1, where the handle is located.

The litter for cats and other domestic animals illustrated in FIGS. 1 and 2 of the appended drawings comprises a shallow container 3, having a small height, provided with a flat bottom and having an open top. By <flat> bottom is not to be understood a bottom of which the surface is entirely level but rather a bottom which, generally, may be disposed and stably rest upon the ground.

As shown, the container 3 may have a generally rectangular shape with rounded edges and be made of semi-rigid plastic material of the PVC type, although this container may likewise be made out of cardboard or any low-cost similar material. In order to provide the container 3 with sufficient stiffness, bosses 5 may be provided at the bottom. Likewise, reinforcing ribs 7 may be provided along the lateral walls. Finally, in order to reinforce the upper periphery of the walls, a fold 9 terminating into a peripheral moulding 11 may be provided. Of course, the bosses 5, the ribs 7 and the folds 9 of which the use is merely to give the container an adequate stiffness for a minimum of plastic material used, may vary in accordance with the needs or specification of the mould manufacture for the plastic used in the making of the containers 3 or else vary according to the needs or specifications of the merchants responsible for the marketing of the litter.

Whatever be the selection of the material used for the making of the container, it is necessary that the latter be either waterproof or be made waterproof on the inside to avoid that the urine of the animals for which the litter is intended, seep through and come to damage the surface upon which the litter is disposed.

The litter 1 illustrated in the drawings also comprises a thick layer of an absorbent material laid over the bottom of the container. As indicated at the preamble to the present specification, this absorbent material 13 may be of any known type.

The shown litter 1 additionally comprises a membrane intended to hold the absorbent material in position. Presently, this membrane is constituted by a cover 15 which may, advantageously, be made of the same plastic material as the container 3. As illustrated in FIGS. 1 and 2, the cover 15 is advantageously depressed at 17 so as to form a flat central bottom of which the surface is essentially identical to the inner surface of the container close to its upper periphery. Because of this structure, once the cover is inserted over the container, it partially nests in the latter and such a nesting provides, in turn, a general further reinforcement of the litter as long as the latter is not opened. Advantageously, the sunk wall 17 of the cover 15 is selected such as to reach, once the cover is nested on the container, essentially the level of the thick layer of absorbent material in order to firmly hold the latter flat against the bottom of the container thereby avoiding any movement or packing of the said absorbent material in case where a void would be left.

In practice, the cover 15 is intended to be tight sealed over the top of the container to hold the thick layer of absorbent material as long as desired in position at the bottom of the container 3. When the cover 15 and the container 3 are made of plastic material, the mounting of the cover 15 in the container 3 may be carried out by heat sealing over all of the periphery 19 of the upper part of the container. Advantageously, sealing may be carried out under vacuum to thus ensure a perfect nesting of the cover in the container up to the level of the thick layer of absorbent material 13. In practice, the owner of a domestic animal may buy the above-described litter in sealed condition. Once at home, he will simply have to pull out the cover 15 and place the container 3 with its absorbent material 13 in it at the usual corner. Once the absorbent material has been soiled, all that the owner of the animal need do is to take the container and throw the whole in a garbage can without having to be bothered with any cleaning. Of course, a new litter of the same type must immediately be installed where the discarded one was located.

In order to facilitate handling and transportation of the litter when the latter is closed, as well as facilitating removing or pulling out of the membrane-forming cover 15, a handle 21 may be integrated to one of the ends of the cover 15, as clearly shown in FIGS. 1 and 2.

Figure 3:
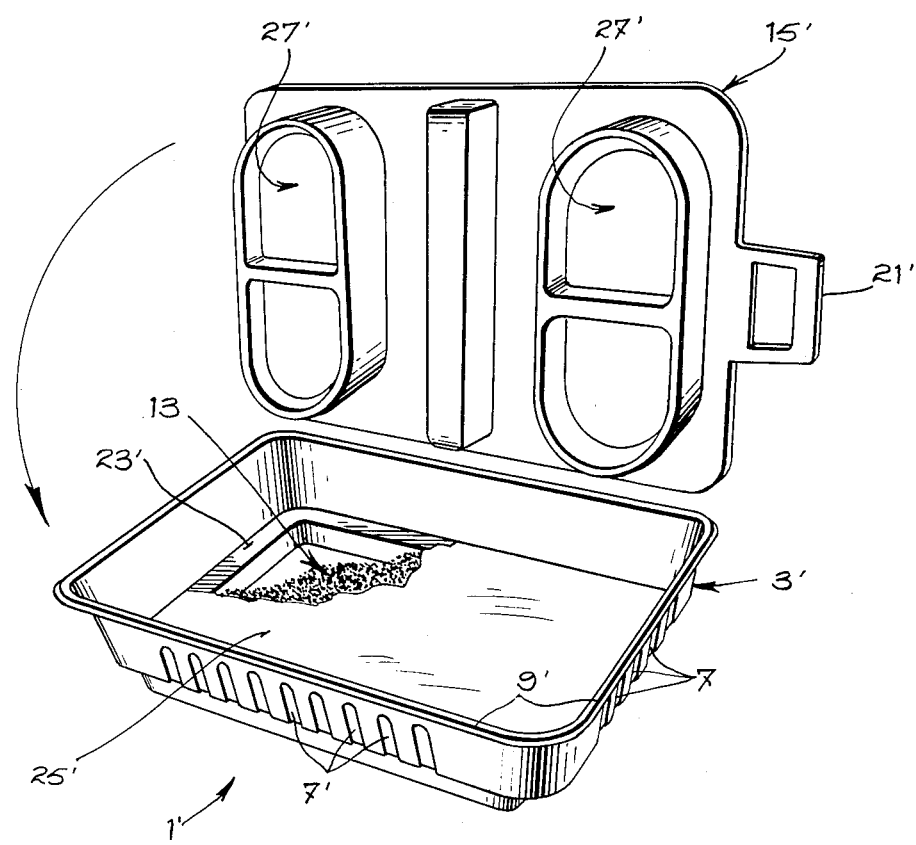
FIG. 3 is a perspective view of a litter for cats or other domestic animals made according to the invention and provided with a membrane and a cover moulded in such a way as to provide two feeding troughs.

The litter 1', shown in FIG. 3 of the appended drawings, for dogs or other domestic animals is a different embodiment of the litter 1 previously described. For that reason, the same elements illustrated in FIG. 3 are identified by the same reference numerals with an added prime <<'>> mark. As in the case of the litter 1, the litter 1' comprises a container 3' provided with a flat bottom and an open top. This container 3' is advantageously of rectangular form with rounded angles and is provided with stiffening ribs 7' as well as folds 9' of which the sole use is to ensure an adequate stiffness.

The walls of the container 3' form, all around the bottom of the latter, a slight rabbet defining an annular shoulder 23' of which the use is explained hereinafter.

The litter 1' also comprises a layer of absorbent material 13' disposed at the bottom of the container up to essentially the height of the shoulder 23'.

Finally, the litter 1' comprises a membrane 25' which may be a simple sheet of oiled paper or a sheet of plastic material glued or heat sealed immediately on the surface of the shoulder 23'. The purpose of this membrane 25' is essentially to hold the layer of absorbent material 13' as long as desired in firm position at the bottom of the container 3'.

The membrane 25' may be provided with a pulltab or any other appropriate means making it possible to remove it from the surface of the shoulder 23'. This membrane 25' may also be used for labelling the product.

As can easily be gathered, the arrangement of the absorbent material 13 at the bottom of the container 3' makes it possible for another like container 3' to nest within the former, this nesting reducing to a minimum the volume occupied by litters when the latter are moved about.

As a promotional feature, a cover 15' may be provided further to the membrane 25'. This cover 15' may be heat sealed to the very upper periphery of the container 3', may be provided with a handle 21' and may be moulded such as to create one or two disposable feeding-troughs 27 and 27' that can easily be cut out by the buyer of the litter to be used for feeding or watering his domestic animal.

It is obvious that the invention is not restricted to the particular embodiments which have just been described as well with respect to shape as with respect to construction. Thus, by way of example, it is possible to foresee litters of the same type which are round in shape so as to come to directly nest at the bottom of a bird cage. It is also possible to foresee a litter of this same type which would be made of thick cardboard in which case the cover 15 would be glued rather than hot sealed to the container 3.

I claim:

1. A disposible litter for cats or the like domestic animals, comprising:

a generally rectangular, open-top shallow container made of a low cost material selected from the group consisting of semi rigid plastic materials and cardboards of medium thichness waterproofed on at least one face thereof, said conatiner comprising a flat bottom surrounded by lateral walls provided with a plurality of folds and ribs to ensure adequate stiffness, said lateral walls forming, all around said flat bottom, a slight rabbet defining an annular shoulder of small height, said shoulder having an upper surface extending over all of the periphery of said flat bottom;

a layer of absorbent material disposed at the bottom of the container up to essentially tne height of the sholder, said absorbent material being selected from the group consisting of sawdust, woodchips, paper pellets, sand, cork granules and other similar material; and a membrane of paper or plastic material secured directly onto the upper surface of the annular shoulder of the container all around the same, for holding the layer of absorbent material in position at the bottom of said container as long as desired, said membrane, once removed, giving access to said layer of absorbent material and transforming said layer of absorbent material and said container into which it is disposed, into a litter that may be discarded once the layer of absorbent material is soiled.

2. A disposable litter as claimed in claim 1, wherein said container is made of semi rigid plastic material.

3. A disposable litter as claimed in claim 2, wherein said membrane is heat-sealed onto the upper surface of the annular shoulder of said container.

4. A disposible litter as claimed in claim 3, characterized in that it further comprises a cover sealed over the container, above the membrane.

5. A litter as claimed in claim 4, characterized in that the cover is moulded so as to form at least one disposable feeding-trough.

6. A disposable litter as claimed in claim 5, characterized in that it further comprises a handle for facilitating handling and transportation.

* * * * *

UNITED STATES PATENT AND TRADEMARK OFFICE
CERTIFICATE OF CORRECTION

PATENT NO. : 4,716,853

DATED : January 5, 1988

INVENTOR(S) : René S. D'ANIELO

It is certified that error appears in the above-identified patent and that said Letters Patent is hereby corrected as shown below:

In the front page of the patent, the inventor's name given in paragraph /¯76_7 as "René S. d'ANIELLO" should actually read: --René SCOTTO D'ANIELO--. Item [19] "d'Aniello" should read -- Scotto d'Anielo --.

Signed and Sealed this

Sixteenth Day of August, 1988

Attest:

DONALD J. QUIGG

*Attesting Officer*  *Commissioner of Patents and Trademarks*